United States Patent [19]

Karabinis et al.

[11] Patent Number: 4,564,952
[45] Date of Patent: Jan. 14, 1986

[54] COMPENSATION OF FILTER SYMBOL INTERFERENCE BY ADAPTIVE ESTIMATION OF RECEIVED SYMBOL SEQUENCES

[75] Inventors: Peter D. Karabinis, Atkinson; Thomas L. Osborne, Sandown, both of N.H.

[73] Assignee: AT&T Bell Laboratories, Murray Hill, N.J.

[21] Appl. No.: 559,473

[22] Filed: Dec. 8, 1983

[51] Int. Cl.⁴ .......................... H04B 3/04; H04B 1/10
[52] U.S. Cl. ....................................... 375/14; 375/18; 375/101; 333/18
[58] Field of Search ...................... 333/18; 375/11, 12, 375/14, 18, 101, 103; 358/905; 364/724, 825

[56] References Cited

U.S. PATENT DOCUMENTS

| | | | |
|---|---|---|---|
| 3,600,681 | 8/1971 | Arbuckle | 375/14 |
| 3,974,449 | 8/1976 | Falconer | 375/14 |
| 4,035,725 | 7/1977 | Guidoux | 333/18 |
| 4,181,888 | 1/1980 | Falconer | 333/18 |
| 4,213,095 | 7/1980 | Falconer | 375/14 |
| 4,237,554 | 12/1980 | Gitlin et al. | 338/18 |
| 4,308,618 | 12/1981 | Lévy et al. | 338/18 |
| 4,334,313 | 6/1982 | Gitlin et al. | 364/724 |

Primary Examiner—Robert L. Griffin
Assistant Examiner—Raymond C. Glenny
Attorney, Agent, or Firm—David R. Padnes

[57] ABSTRACT

Compensation for arbitrary combinations of linear and nonlinear distortion is provided by altering a received symbol value by a preselected amount. This amount is based on an estimate of the sequence of transmitted symbol values represented by the received symbol value at a sampling time and a number of received symbol values at other sampling times. The altered symbol value is then compared with the closest one of the possible transmitted symbol values to determine the difference, if any, therebetween. The closest one of the possible transmitted symbol values is then outputted if the difference meets a prescribed criterion. If not, the received symbol value is altered by a different amount in response to another estimate until the recited difference meets the prescribed criterion. In the disclosed embodiments, the foregoing technique is incorporated in a memory-based canceler or transversal filter.

26 Claims, 5 Drawing Figures

FIG. 5
MULTIPLIER SUMMER CIRCUIT

COMPENSATION OF FILTER SYMBOL INTERFERENCE BY ADAPTIVE ESTIMATION OF RECEIVED SYMBOL SEQUENCES

TECHNICAL FIELD

The present invention relates to distortion compensation in digital communications systems and, more particularly, to the adaptive cancellation or equalization of linear and nonlinear intersymbol interference in such systems.

BACKGROUND OF THE INVENTION

Intersymbol interference is a form of distortion that has long been an obstacle to the error-free reception of digital symbols. Indeed, with the burgeoning growth of high-speed digital communications, intersymbol interference is perhaps the major impediment to the accurate reception of digital information. This distortion phenomenon results from the fact that a pulse propagating through a band-limited channel expands in the time domain. Accordingly, each received symbol, ideally equal to a particular transmitted symbol, is now a combination of the transmitted symbols.

Intersymbol interference is characterized as being linear or nonlinear. In linear intersymbol interference, each received symbol is a weighted linear sum of an associated transmitted symbol—which the received symbol ideally represents in the absence of distortion—along with other transmitted symbols which precede and succeed the associated symbol in time. The weighting coefficient for each transmitted symbol, while varying in time, is independent of the sequence of transmitted symbols. In nonlinear intersymbol interference, while each received symbol is also a function of an associated transmitted symbol along with preceding and succeeding transmitted symbols, the weighting coefficient for each symbol is a function of the transmitted symbol sequence. Hence, each received symbol represents a linear combination of products of the associated transmitted symbol and preceding and succeeding transmitted symbols and/or the complex conjugate of such symbols.

Because the weighting coefficients in linear intersymbol interference are independent of the transmitted symbol sequence, this form of intersymbol interference is easier to analyze and a number of techniques have been quite successful in compensating for such distortion. These techniques include linear feedforward equalization and decision feedback equalization. In accordance with the former technique, each received symbol is added to a weighted linear sum of past and future symbols prior to a decision being made as to the value of the transmitted symbol. In accordance with the latter technique, a weighted linear sum of past decisions is added to each received symbol, again prior to a decision being made as to the value of the transmitted symbol. See, for example, U.S. Pat. No. 3,974,449 issued to D. D. Falconer on Aug. 10, 1976.

A number of techniques are also known for the compensation of nonlinear intersymbol interference. See, for example, U.S. Pat. No. 3,600,681 to T. Arbuckle issued Aug. 17, 1971 and U.S. Pat. No. 4,181,888 and No. 4,213,095 issued to D. D. Falconer on Jan. 1, 1980 and July 15, 1980, respectively. These cited techniques, while somewhat successful, have either not been fully effective in compensating for nonlinear intersymbol interference and/or require circuitry whose complexity grows rapidly with the order of nonlinearity in the transmission channel. This latter shortcoming can make the known techniques ill-suited from a cost standpoint for many systems applications. Therefore, a technique for effectively compensating for both linear and nonlinear intersymbol interference without the need for complex hardware arrangements would be desirable.

SUMMARY OF THE INVENTION

Pursuant to the present invention, compensation for linear and nonlinear intersymbol interference in a digital communications system is provided by altering the value of a received symbol based on an estimate of the sequence of transmitted symbol values represented by the received symbol and a number of symbols received prior to and/or after the received symbol. The altered received symbol value is then compared with the closest one of the possible transmitted symbol values to determine the difference therebetween. If the difference meets a prescribed criterion, the closest one of the possible transmitted symbol values is outputted in lieu of the received symbol value. If not, the received symbol value is altered in response to different estimates of the same transmitted symbol value sequence until the prescribed criterion is met. Since the closest one of the possible transmitted symbol values is outputted, compensation for other forms of distortion is also advantageously provided.

A feature of the present invention is that it is adaptable for use in a memory-based transversal equalizer or a memory-based distortion canceler.

A further feature of the present invention is that the hardware required is substantially independent of the order of nonlinearity in the transmission channel.

DETAILED DESCRIPTION

Figure 1:
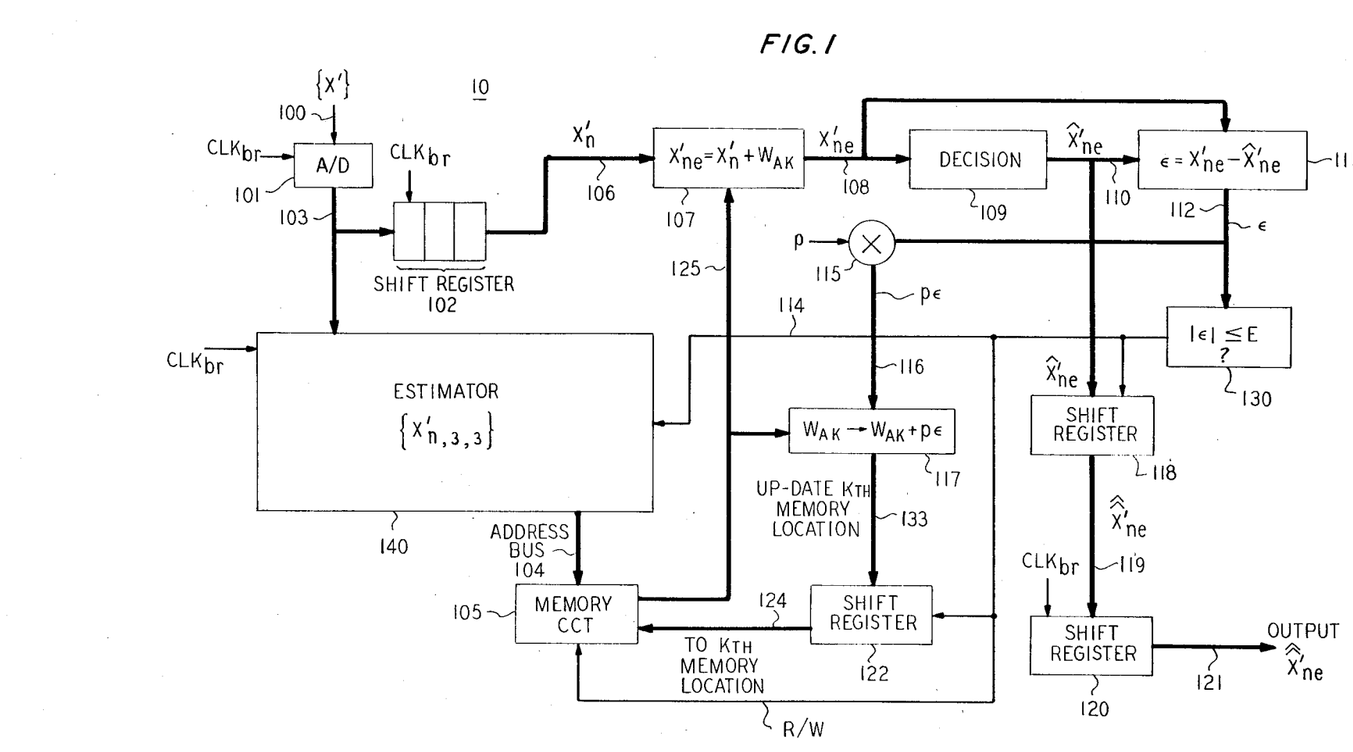
FIG. 1 is a block schematic diagram of a first embodiment of the present invention.

Distortion canceler 10 for eliminating arbitrary combinations of linear and nonlinear intersymbol interference, in accordance with the present invention, is shown in FIG. 1. Canceler 10 is assumed to be within the receiver of a digital communication system. For purposes of illustration, the communication system is a digital radio system which transmits a 16 QAM (quadrature amplitude-modulated) signal and canceler 10 is disposed within either the I or Q signal rails. Accordingly, canceler 10 receives symbols in the form of amplitude-modulated pulses on input lead 100 which are generated by demodulating an incoming carrier signal using conventional circuitry (not shown). Each pulse at the sampling time has a value which represents one of four possible transmitted symbol values. While each received symbol corresponds to one transmitted symbol, the value of each received symbol is typically unequal to any of the four possible transmitted symbol values due to the presence of intersymbol interference.

At this juncture, it should be noted that the operation of canceler 10, and that of a transversal equalizer structure to be discussed in reference to FIG. 2 hereinbelow, is based on the realization that any arbitrary combination of linear and nonlinear intersymbol interference in the received symbol at any sampling time is a function of the transmitted symbol sequence. While the sequence of transmitted symbols extends over an infinite time span for continuously transmitting digital systems and, therefore, can't be directly used for intersymbol interference compensation, simplifications can be made as the contribution of each transmitted symbol to the intersymbol interference in any particular received symbol is not the same. Typically, the contribution of transmitted symbols corresponding to received symbols at sampling times distant from any selected sampling time is far less than the contribution of transmitted symbols corresponding to received symbols at and proximate to the selected sampling time. Accordingly, an unwieldy sequence comprising all the transmitted symbols need not be examined. Indeed, compensation for intersymbol interference in a received symbol at a particular sampling time can be provided with a high degree of accuracy as a function of the sequence of transmitted symbols represented by the received symbols at the particular sampling time and sampling times which surround the particular sampling time by some preselected number of symbol periods. The number of symbols in this truncated sequence can be varied and, in general, is selected so that the intersymbol interference contribution of transmitted symbols not considered is small.

Pursuant to the present invention, the value of each received symbol at the sampling time is altered by a preselected amount. The preselected amount is based on an estimate of the sequence of transmitted symbol values represented by the received symbol value at the sampling time and the received symbol values at a number of preceding and succeeding sampling times. Since each received symbol has a value representing one of a four possible transmitted symbol values, there are $S^4$ possible estimates, where S is the number of transmitted symbols in the estimated sequence. The altered received symbol value is then compared to the closest one of the possible transmitted symbol values to determine the difference, if any, therebetween. The closest symbol value is then outputted if the determined difference meets a prescribed criterion. If not, the received symbol value is altered by a different amount, based on another estimate of the sequence of transmitted symbol values, and another comparison is performed. This process is repeated until the prescribed criterion is met. Advantageously, this methodology can be incorporated within an adaptive, memory-based canceler or equalizer structure and the required hardware is, to a large extent, independent of the order of nonlinearity in the transmission channel. Moreover, in the disclosed implementations, as one of the possible transmitted symbol values is outputted in lieu of each received symbol, compensation for other forms of distortion introduced in the transmission channel is also provided.

Referring to FIG. 1, the sequence of received symbols $\{X'\}$ comprising amplitude-modulated pulses is coupled via lead 100 to analog-to-digital (A/D) converter 101. Converter 101 quantizes the amplitude of each pulse at the sampling time to the closest one of a discrete number of amplitude values. Each of the assigned amplitude values is represented by an 8-bit word. Representation of the amplitude values by 8-bit words is, of course, merely illustrative, as any number of bits per word can be used. The sampling time is controlled by the baud rate clock, $CLK_{br}$, which is generated by conventional receiver circuitry (not shown) using well-known techniques.

For purposes of clarity, we will denote the received symbol and the outputted 8-bit work at the $n^{th}$ sampling time, where n is any integer, by $X'_n$. The prime superscript (') indicates the assumed presence of distortion. $X'_n$ is coupled by bus 103 to shift register 102. Shift register 102, also clocked by $CLK_{br}$, imparts a delay of 3 symbol periods to $X'_n$ before outputting this symbol onto bus 106. Such delay is necessary to synchronize the movement of $X'_n$ through canceler 10 with the operation of estimator 140.

Estimator 140, also clocked by $CLK_{br}$, forms estimates of the sequence of transmitted symbol values represented by $X'_n$ and the received symbol values at three immediately preceding and three immediately succeeding sampling times. This sequence of seven successively received symbols is denoted by $\{X'_{n,3,3}\}$ and comprises $X'_{n-3}$, $X'_{n-2}$, $X'_{n-1}$, $X'_n$, $X'_{n+1}$, $X'_{n+2}$ and $X'_{n+3}$, where the subscript denotes the sampling time associated with each symbol relative to the $n^{th}$ sampling time and the prime superscript (') indicates the assumed presence of distortion. Hence, $X'_{n-3}$ is the first received symbol in the sequence and $X'_{n+3}$ is the last received symbol in the sequence. For the illustrative 16-QAM system application, there are $7^4$ possible estimates of $\{X'_{n,3,3}\}$.

Each estimate formed by estimator 140 is successively coupled to memory circuit 105 via address bus 104. Memory circuit 105 stores a compensating value $W_{AK}$ in the form of an 8-bit word for each of the possible estimates of $\{X'_{n,3,3}\}$ and each estimate of $\{X'_{n,3,3}\}$ on address bus 104 causes an associated value of $W_{AK}$ to be read out onto bus 125. Each value of $W_{AK}$ when added to $X'_n$ compensates for the intersymbol interference present, provided the correct estimate of $\{X'_{n,3,3}\}$ has been made. Digital adder 107 sums $X'_n$ with $W_{AK}$ and provides this sum, designated as $X'_{ne}$, on bus 108.

To determine whether any particular estimate formed by estimator 140 is correct, $X'_{ne}$, the adjusted symbol value of $X'_n$, is coupled to decision circuit 109 and digital subtractor 111. Decision circuit 109, comprising well-known signal-slicing circuitry, quantizes $X'_{ne}$ to the closest one of the four possible transmitted symbol values and passes this closest symbol value $\hat{X}'_{ne}$ via bus 110 to subtractor 111. The "hat" superscript ( ) indicates that the associated symbol is an estimate of the symbol term sans the "hat" superscript. Subtractor 111 forms the difference $\epsilon = \hat{X}'_{ne} - X'_{ne}$ which is then supplied to threshold circuit 130. If the absolute value of $\epsilon$ is less than or equal to some acceptable error quantity, E, a logical "1" pulse is generated on lead 114 which gates $\hat{X}'_{ne}$ through shift register 118 onto bus 119. Since this estimate is correct, it is designated as $\hat{X}'_{ne}$. The quantity E preferably is at least of the order of the standard deviation of the thermal noise to minimize erroneous results from threshold circuit 130. Shift register 120 then provides a properly synchronized output by gating $\hat{X}'_{ne}$ onto output bus 121 on a $CLK_{br}$ clock pulse.

The presence of a logical "1" pulse also stops estimator 140 from generating further estimates of $\{X'_{n,3,3}\}$ which are now unnecessary as the correct estimate of $\{X'_{n,3,3}\}$ has been made. In addition, canceler 10 advantageously comprises circuitry which periodically updates the stored value of $W_{AK}$. Specifically, each difference ε formed by subtractor 111 is multiplied by a predetermined constant p by multiplier 115 and the product form is then coupled through bus 116 to adder 117. Digital adder 117 sums the current $W_{AK}$ quantity on bus 125 with the product of p and the associated difference ε. This sum, appearing on bus 133, is gated through shift register 122 onto bus 124 and thence to memory circuit 105. By using the logical "1" pulse on lead 114 as a write signal to the memory circuit, the location storing the $W_{AK}$ value for a correct estimate of $\{X'_{n,3,3}\}$ is updated by an amount pε. This location is designated as the $K^{th}$ location, where $1 \leq K \leq S^4$. The updated $W_{AK}$ value is then used the next time the same estimate of $\{X'_{n,3,3}\}$ is formed. Accordingly, canceler 10 tracks changes in the distortion introduced within the transmission channel over time.

If, however, the absolute value of the determined difference ε is greater than E, lead 114 is at logical "0". With lead 114 at logical "0", estimator 140 continues forming estimates of $\{X'_{n,3,3}\}$, memory circuit 105 is not updated, and the value of $X'_{ne}$ is not gated to output bus 121. Therefore, the sequence of altering $X'_n$ by a particular $W_{AK}$ value, generating $X'_{ne}$ and determining ε continues until the absolute value of ε is less than or equal to E. Therefore, to retain synchronization, the process of determining the correct estimate of $\{X'_{n,3,3}\}$ and the associated value of $X'_{ne}$ must be accomplished within the symbol period to avoid the need for symbol buffers.

In the preceding discussion relative to FIG. 1, estimator 140 preferably has the capability of forming up to $7^4$ successive estimates of $\{X'_{n,3,3}\}$ within one symbol period to avoid the need for buffering the received symbol sequence $\{X'\}$. However, the required operating speed of estimator 140 is $7^4$ times the baud rate which can exceed the capability of state-of-the-art devices. Of course, the operating speed of estimator 140 can be reduced to a fraction of that otherwise required by using a parallel structure wherein the operation of estimator 140, adder 107, decision circuit 109 and subtractor 111 is duplicated so as to simultaneously provide a number of ε values, and wherein each ε corresponds to a different estimate of $\{X'_{n,3,3}\}$. The $X'_{ne}$ term corresponding to the smallest absolute value of ε which is also equal to or less than E would be outputted. The most economical solution, however, is to utilize the estimator 140 structure shown in FIG. 3. While the estimator structure of FIG. 3 reduces the hardware and operating speed requirements, there are certain system assumptions which have been made. First, at the start-up of canceler 10 operation, it is assumed that there is no linear dispersion in the transmission channel. Second, it is assumed that at canceler start-up, there is no nonlinear intersymbol interference. The first assumption can be satisfactorily approximated by starting canceler 10 during periods, such as the midday hours, when dispersive effects in the atmosphere are very low. The second assumption can be satisfactorily approximated by providing predistortion or, equivalently, reducing the drive level of the power amplifier in the transmitter so that nonlinear intersymbol interference is substantially eliminated. With the above assumptions, each of the received symbol values at start-up is substantially equal to one of the four transmitted symbol values and iterative estimation of $\{X'_{n,3,3}\}$ is not necessary. When, however, the two assumptions cannot be approximated, then only the last received symbol, $X'_{n+3}$, need be estimated. Consequently, only four estimates of $\{X'_{n,3,3}\}$ need be formed and examined in one symbol period.

Figure 3:
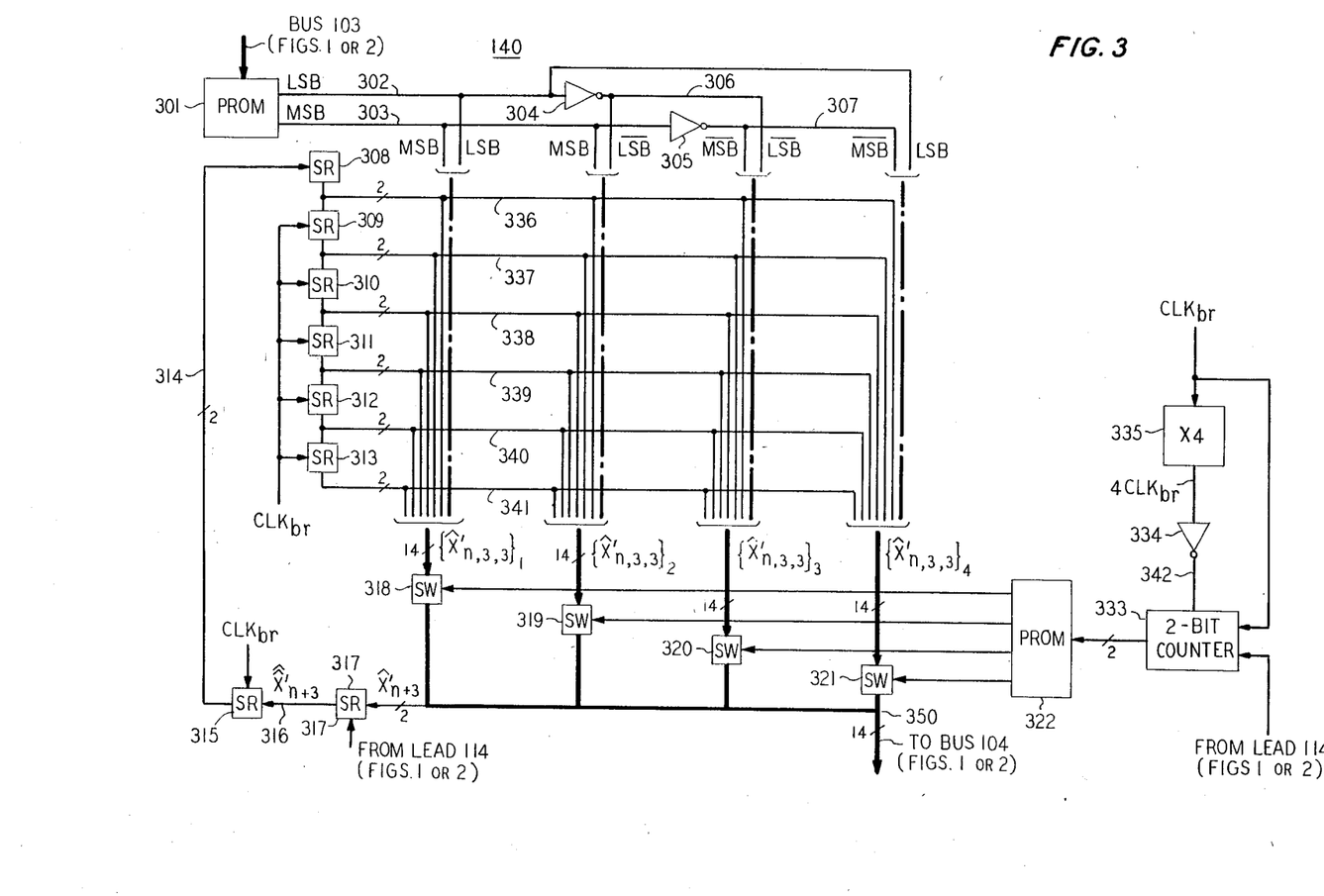
FIG. 3 is a detailed schematic of the estimator used in the disclosed embodiments.

Refer now to FIG. 3 which shows the circuitry for estimator 140 which utilizes the two discussed start-up assumptions to reduce the required hardware and operating speed. The 8-bit words generated by A/D converter 101 are coupled via bus 103 to PROM 301. PROM 301 assigns these 8-bit words to the closest one of the four possible transmitted symbol values. Each of these four possible transmitted symbol values has a different 2-bit digital representation and the assigned 2-bit words appear on leads 302 and 303 with lead 302 receiving the least significant bit (LSB) and lead 303 receiving the most significant bit (MSB). Inverter 304 forms $\overline{\text{LSB}}$, the complement of LSB, on lead 306, and inverter 305 forms $\overline{\text{MSB}}$, the complement of MSB, on lead 307.

Shift registers 308, 309, 310, 311, 312 and 313, each clocked by $CLK_{br}$, respectively gate the 2-bit word representations of received symbols $X'_{n+2}$, $X'_{n+1}$, $X'_n$, $X'_{n-1}$, $X'_{n-2}$ and $X'_{n-3}$ onto leads 336, 337, 338, 339, 340 and 341. As will be discussed, these 2-bit words correctly represent their associated symbols and were formed during estimation of the prior received symbol sequences used for compensating for distortion in priorly received symbols. The first estimate of $\{X'_{n,3,3}\}$, designated as $\{X'_{n,3,3}\}_1$, is formed by combining the bits on leads 302 and 303 with twin lead buses 336 through 341. Similarly, $\{X'_{n,3,3}\}_2$, $\{X'_{n,3,3}\}_3$, $\{X'_{n,3,3}\}_4$, the $2^{nd}$, $3^{rd}$, and $4^{th}$ estimates of $\{X'_{n,3,3}\}$, are formed by respectively combining buses 336 through 341 with leads 303 and 306, with leads 306 and 307, and with leads 302 and 307.

Electronic switches 318 through 321 are individually closed by a different one of four 4-bit output words from PROM 322 to successively couple $\{X'_{n,3,3}\}_1$, $\{X'_{n,3,3}\}_2$, $\{X'_{n,3,3}\}_3$, and $\{X'_{n,3,3}\}_4$ to node 350 in one symbol period. Node 350 is connected to address bus 104. Each output word from PROM 322 is read out in response to an address provided by 2-bit counter 333 which, in turn, is clocked by a signal at four times $CLK_{br}$, 4 $CLK_{br}$, on lead 342. This signal is generated from $CLK_{br}$ using 4 times multiplier 335 and inverter 334. The addresses provided by counter 333 are inhibited by the logical "1" state of lead 114 and a $CLK_{br}$ pulse initializes counter 333.

A logical "1" state on lead 114 also causes the correct estimate of $X'_{n+3}$, designated as $\hat{X}'_{n+3}$, to be gated through shift register 317 onto twin lead bus 316 which, in turn, is gated through shift register 315 onto twin lead bus 314 on a $CLK_{br}$ pulse. Bus 314 is connected to the first of a series connection of 6 shift registers 308 through 313. As a result, the correct estimate of any given received symbol value is used in seven different received symbol value sequences, wherein each sequence is associated with one of seven successively received symbols on bus 103. One of these seven received symbols is the given received symbol, three are symbols received before the given symbol, and three are symbols received after the given symbol.

Figure 4:
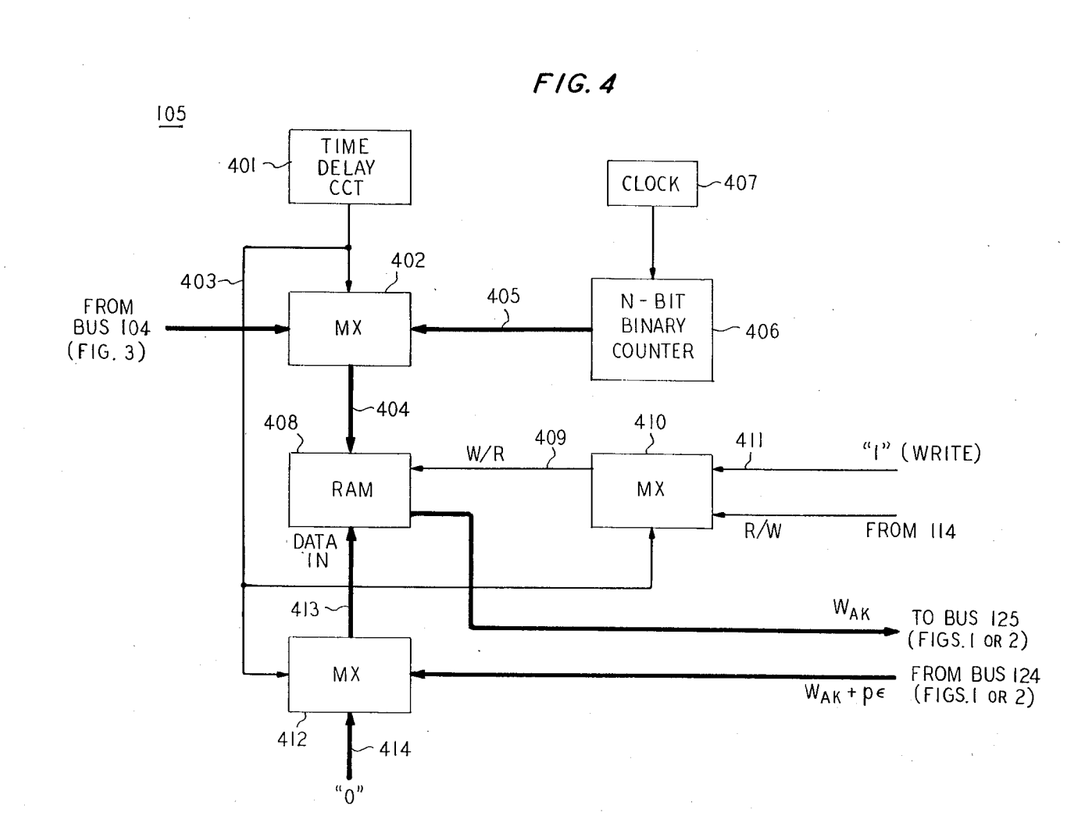
FIG. 4 is a block schematic diagram of the memory circuit used in the disclosed embodiments.

FIG. 4 shows the detailed circuitry of a memory circuit 105 designed to operate with the estimator of FIG. 3. At start-up of canceler 10 delay circuit 401 provides a logical "0" on lead 403 for a predetermined time interval. After this interval, delay circuit 401 provides a continuous logical "1" on lead 403.

During the predetermined time interval, RAM 408 is loaded with all zero 8-bit $W_{AK}$ words in every one of the $7^4$ addresses. These zero values are supplied over bus 414 from a reference source to multiplexer 412 which, under the control of a logic "0" state on lead 403, couples bus 414 to data input bus 413. Multiplexer 410, also under the control of a logic "0" on lead 403, provides a continuous logic "1" write signal from lead 411 to read/write (R/W) lead 409. The sequential addressing of the RAM is provided by the count of N-bit binary counter 406. This count appears on bus 405 and is coupled to RAM address bus 404 by multiplexer 402 by virtue of the logic "0" state on lead 403. Counter 406 is clocked by clock pulses from a clock source 407 which provides at least $7^4$ pulses within the predetermined time interval. Hence, during the initial reception of distortionless symbols after the predetermined time interval, an appropriate zero value of $W_{AK}$ is supplied. However, after the predetermined time interval and lead 403 is logical "1", multiplexer 402 couples the contents of address bus 104 to RAM address bus 404, multiplexer 410 couples the state of lead 114 to R/W lead 409, and multiplexer 412 couples the contents of bus 124 to data input bus 413. As a result, the $W_{AK}$ values in RAM 408 are updated to compensate for the presence of distortion after start-up.

Figure 2:
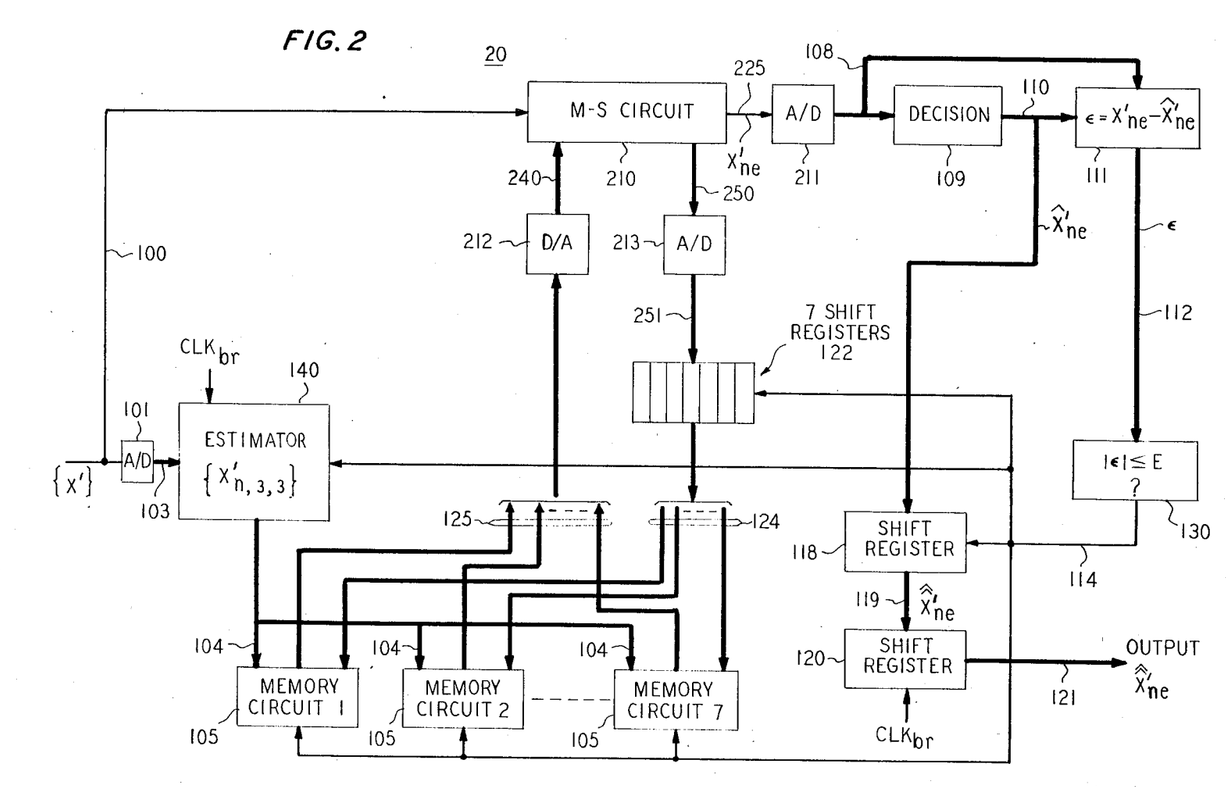
FIG. 2 is a block schematic diagram of a second embodiment of the present invention.

Refer now to FIG. 2 which illustrates the principles of the present invention embodied within an adaptive transversal equalizer 20. For purposes of consistency, equalizer 20 is also assumed to be located within the I or Q rails of a receiver which receives a 16-QAM signal. The sequence {X'}, comprising a succession of amplitude-modulated pulses, is supplied to A/D converter 101 and multiplier-summer (M-S) circuit 210, the latter comprising a transversal filter having 7 tap weights. A/D converter 101 supplies 8-bit word representation to estimator 140 which then generates a succession of estimates of $\{X'_{n,3,3}\}$. Each estimate of $\{X'_{n,3,3}\}$ is supplied to seven memory circuits 105. Each memory circuit stores a different one of the 7 tap-weight coefficients, designates as $C_{-3}$, $C_{-2}$, $C_{-1}$, $C_0$, $C_{+1}$, $C_{+2}$ and $C_{+3}$. Each of these coefficients is supplied over a bus 125 through D/A converter 212 to bus 240 and thence to M-S circuit 210. M-S circuit 210 operates on amplitude-modulated pulses and, therefore, D/A converter 212 and A/D converters 211 and 213 are required at the interfaces between M-S circuit 210 and the replicated circuitry of canceler 10.

As will be discussed in detail below, M-S circuit 210 generates an amplitude-modulated pulse which is an equalized version of $X'_n$, the received symbol value at the $n^{th}$ sampling time. This pulse and the corresponding word generated by A/D converter 211 on bus 108 is referenced as $X'_{ne}$.

Decision circuit 109, subtractor 111, threshold circuit 130, connected by buses 108, 110 and 112, provide the same functions as in canceler 10. Therefore, when the absolute value of $\epsilon$ is $\leq E$, a logical "1" signal on lead 114 inhibits the generation of further estimates of $\{X'_{n,3,3}\}$ by estimator 140, and $X'_{ne}$ on bus 110 being a correct estimate $X'_{ne}$, is gated through shift register 118 to bus 119. Shift register 120, as before, then couples $X'_{ne}$ to output bus 121 on a $CLK_{br}$ pulse.

M-S circuit 210 advantageously provides updated tap-weight coefficients as a function of an internally generated error signal for each $X'_{ne}$. Each of these updated coefficients is outputted on bus 250, converted to 8-bit words by A/D converter 213, and supplied to bus 251. Each of 7-shift register 122 then gates each updated coefficient to the associated one of the memory circuits 105 via one of the buses 124. The updated coefficients are then written into the current address for memory circuits 105. If the absolute value of a $\epsilon$ is $>E$, the logical "0" state on lead 114 causes estimator 140 to continue forming estimates, the value of $X'_{ne}$ on bus 110 is not gated through shift register 118 and the updated coefficients on bus 251 are not supplied and written into memory circuits 105.

Figure 5:
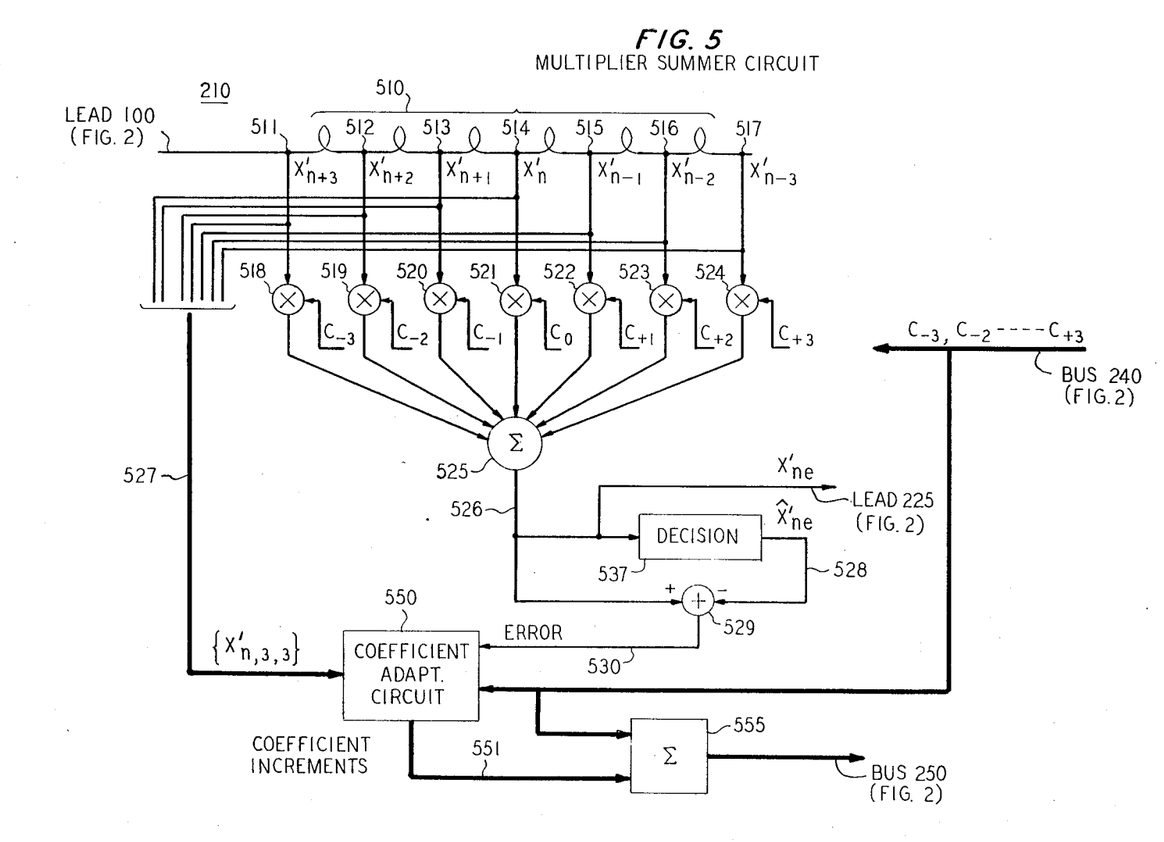
FIG. 5 is a detailed schematic of the multiplier-summer circuit used in the embodiment of FIG. 2.

M-S circuit 210, as shown in FIG. 5, comprises a conventional transversal filter which alters symbol value $X'_n$ so as to compensate for the effects of linear and nonlinear intersymbol interference. Referring to FIG. 5, delay line 510 provides six symbol period delays so as to form symbol values $X'_{n+3}$, $X'_{n+2}$, $X'_{n+1}$, $X'_n$, $X'_{n-1}$, $X'_{n-2}$ and $X'_{n-3}$ at taps 511 through 517, respectively. Each of these symbol values is fed to an associated one of multipliers 518 through 524 and all these symbol values are coupled through bus 517 to coefficient adaptation circuit 550.

Each of multipliers 518 through 524 forms the product of the supplied symbol value and an associated one of tap-weight coefficients, $C_{-3}$, $C_{-2}$, $C_{-1}$, $C_0$, $C_{+1}$, $C_{+2}$ and $C_{+3}$, as shown in FIG. 5. The sum of all such products is designated as $X'_{ne}$ and appears on lead 526.

Decision circuit 537 assigns $X'_{ne}$ to the closest one of the 4 possible transmitted symbol values referenced as $X'_{ne}$. Subtractor 529 forms the difference $X'_{ne} - X'_{ne}$ on lead 530 which is an internal M-S circuit error signal used by coefficient adaptation circuit 550.

Coefficient adaptation circuit 550, comprising well-known circuitry, provides incremental values for each of the supplied tap-weight coefficients. These incremental values may be positive or negative. The mechanism for generating these incremental values can be in accordance with a number of known algorithms, such as least mean square, hybrid least mean square, or zero forcing, with the algorithm chosen determining the connections to circuit 550. FIG. 5 illustrates the interconnections for the least mean square algorithm or any variation thereof wherein the incremental values are a function of the error signal on lead 530 and $\{X'_{n,3,3}\}$ supplied via bus 527. As is well-known, however, if zero forcing was utilized, lead 528 would be coupled to circuit 550 in lieu of bus 527. Regardless of the algorithm used by circuit 550, the incremental values appear on bus 551 and are added to the associated tap-weight coefficients on bus 240 by summer 555. The output of summer 555 passes through A/D converter 213 and is gated to memory circuit 105 when a correct estimate of $X'_{ne}$ is made.

It should, of course, be understood that the present invention is not limited to the particular embodiments disclosed and that numerous modifications will occur to those skilled in the art which are within the spirit and scope of the invention. First, for example, the present invention is applicable to any digital system. Second, for a cross-polarized QAM signal, cross-rail and cross-polarization compensation can be provided by separately supplying the I and Q rail symbols of both polarizations to the symbol sequence estimator. Hence, the estimator forms each estimate based on four sets of symbols, i.e., the I and Q symbols of both polarizations, from four different buses. For the embodiment of FIG. 1, this merely requires the addition of three A/D converters 101 which solely supply estimator 140. For the embodiment of FIG. 2, the same alteration is required and, in addition, the three additional symbol inputs are each supplied to an associated delay line having tap-weight multipliers, such as delay line 510 in FIG. 5. Coefficient adaptation circuit 550 would be interconnected depending on the utilized algorithm as discussed previously and the output of all of the tap-weight multipliers is supplied to summer 525. The output of summer 525 is then outputted and updated as shown in FIG. 5. Third, the estimated sequence denoted as $\{X'_{n,3,3}\}$ can comprise any number of symbols greater than one and, therefore, the number of received symbols before and after the $n^{th}$ sampling time need not be equal. Indeed, the number of symbols preceding and succeeding $X'_n$ can be adjusted as desired. Lastly, while the multiplier-summer circuit in FIG. 2 comprises taps at multiples of the symbol period, fractionally-spaced taps can also be used.

What is claimed is:

1. Apparatus for compensating for distortion in received digital symbol values wherein each received symbol value represents one of a plurality of transmitted symbol values, such apparatus comprising
   means for altering a received symbol value by a preselected amount, said amount being in response to an estimate of the transmitted symbol values represented by said received symbol value and N other received symbol values, where N is an integer greater than zero;
   means for comparing said altered symbol value to a closest one of said plurality of transmitted symbol values to determine any difference therebetween; and
   means for outputting said closest one of said plurality of transmitted symbol values in lieu of said received symbol value if said difference meets a prescribed criterion.

2. The apparatus of claim 1 wherein said altering means alters said received symbol value by another amount in response to another estimate of the represented transmitted symbol values if said prescribed criterion is not met.

3. The apparatus of claim 2 wherein said altering means includes a digital adder.

4. The apparatus of claim 2 wherein said altering means includes a transversal filter.

5. The apparatus of claim 1 wherein said altering means includes a digital adder.

6. The apparatus of claim 1 wherein said altering means includes a transversal filter.

7. The apparatus of claim 1 wherein said N other received symbol values comprise a first number of symbol values preceding said received symbol value and a second number of symbol values succeeding said received symbol value.

8. The apparatus of claim 7 wherein said first and second numbers are equal.

9. The apparatus of claim 1 wherein said preselected amount is updated as a function of the determined difference.

10. The apparatus of claim 9 wherein said preselected amount is updated only when said determined difference meets said presecibed criterion.

11. The apparatus of claim 1 wherein said altering means includes an addressable memory.

12. The apparatus of claim 1 wherein a portion of said estimate has been priorly used for distortion compensation of symbol values received before said received symbol value.

13. The apparatus of claim 1 wherein a portion of said estimate is used for distortion compensation of symbol values received after said received symbol value.

14. A method of compensating for distortion in received digital symbol values wherein each received symbol value represents one of a plurality of transmitted symbol values, said method comprising the steps of
   altering a received symbol value by a preselected amount, said amount being in response to an estimate of the transmitted symbol values represented by said received symbol value and N other received symbol values, where N is an integer greater than zero;
   comparing said altered symbol value to a closest one of said plurality of transmitted symbol values to determine any difference therebetween; and
   outputting said closest one of said plurality of transmitted symbol values in lieu of said received symbol value if said difference meets a preselected criterion.

15. The method of claim 14 wherein altering of said received symbol values continues in response to another estimate of the represented symbol values if said prescribed criterion is not met.

16. The method of claim 15 wherein altering said received symbol value is provided by a digital adder.

17. The method of claim 15 wherein altering said received symbol value is provided by a transversal filter.

18. The method of claim 14 wherein altering said received symbol value is provided by a digital adder.

19. The method of claim 14 wherein altering said received symbol value is provided by a transversal filter.

20. The method of claim 14 wherein said N other received symbol values comprise a first number and a second number of symbol values respectively preceding and succeeding said received symbol value.

21. The method of claim 20 wherein said first and second number are equal.

22. The method of claim 14 wherein said preselected amount is updated as a function of the determined difference.

23. The method of claim 22 wherein said preselected amount is updated only when said determined difference meets said prescribed criterion.

24. The method of claim 14 wherein said preselected amount is stored in an addressable memory.

25. The method of claim 14 wherein a portion of said estimate has been priorly used for distortion compensation of symbol values received before said received symbol value.

26. The method of claim 14 wherein a portion of said estimate is used for distortion compensation of symbol values received after said received symbol value.

* * * * *